US008209305B2

(12) United States Patent
Najork

(10) Patent No.: US 8,209,305 B2
(45) Date of Patent: Jun. 26, 2012

(54) INCREMENTAL UPDATE SCHEME FOR HYPERLINK DATABASE

(75) Inventor: Marc A. Najork, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 743 days.

(21) Appl. No.: 11/408,283

(22) Filed: Apr. 19, 2006

(65) Prior Publication Data

US 2007/0250480 A1    Oct. 25, 2007

(51) Int. Cl.
*G06F 17/00* (2006.01)

(52) U.S. Cl. ......... 707/696; 707/715; 707/802; 707/822

(58) Field of Classification Search .............. 707/3, 100, 707/203, 999.1, 999.003, 999.004, 616, 641, 707/646, 690, 696, 713, 715, 736, 752, 776, 707/802, 808, 812, 822, 917, 922
See application file for complete search history.

(56) References Cited

U.S. PATENT DOCUMENTS

| | | | |
|---|---|---|---|
| 5,086,408 A * | 2/1992 | Sakata | 707/999.2 |
| 6,049,799 A | 4/2000 | Mangat et al. | 707/10 |
| 6,098,081 A | 8/2000 | Heidorn et al. | |
| 6,112,203 A | 8/2000 | Bharat et al. | 707/5 |
| 6,253,198 B1 | 6/2001 | Perkins | |
| 6,301,614 B1 | 10/2001 | Najork et al. | 709/223 |
| 6,321,242 B1 | 11/2001 | Fogg et al. | 707/513 |
| 6,338,059 B1 | 1/2002 | Fields et al. | |
| 6,363,396 B1 | 3/2002 | Klots et al. | |
| 6,505,191 B1 | 1/2003 | Baclawski | 707/3 |
| 6,578,078 B1 | 6/2003 | Smith et al. | 709/224 |
| 6,601,066 B1 | 7/2003 | Davis-Hall | 707/5 |
| 6,606,653 B1 | 8/2003 | Ackermann, Jr. et al. | 709/219 |
| 6,638,314 B1 | 10/2003 | Meyerzon et al. | 715/513 |
| 6,681,309 B2 * | 1/2004 | Szendy et al. | 711/173 |
| 6,754,873 B1 | 6/2004 | Law et al. | 715/501.1 |
| 6,772,141 B1 * | 8/2004 | Pratt et al. | 707/999.003 |
| 6,820,085 B2 | 11/2004 | Nishizawa et al. | |

(Continued)

FOREIGN PATENT DOCUMENTS

WO    WO 97/42576    11/1997

OTHER PUBLICATIONS

Adler, M. et al., "Towards Compressing Web Graphs", *CMPSCI Technical Report*, 2000, 5 pages.

(Continued)

*Primary Examiner* — Charles Rones
*Assistant Examiner* — Rezwanul Mahmood
(74) *Attorney, Agent, or Firm* — Woodcock Washburn LLP

(57) ABSTRACT

A database of hyperlinks, stored in a hyperlink store or distributed across multiple machines such as a scalable hyperlink store, may be incrementally updated. When data is added, instead of modifying an existing data store, a hierarchy of data stores is built. The data stores are merged together, such that a new store is a suffix on an old store. Additions and updates go into new stores, which are relatively small. Lookups consult new stores first. A background thread merges adjacent stores. For example, a batch of updates is collected and incorporated into a new store and then the store is sealed. Subsequent updates are added to yet another new store. Stores are merged occasionally to prevent the chain of stores from becoming too long. Once the batch has been integrated, the new stores are sealed and are used to answer subsequent queries.

18 Claims, 8 Drawing Sheets

U.S. PATENT DOCUMENTS

| | | | |
|---|---|---|---|
| 6,886,129 B1 | 4/2005 | Raghavan et al. | |
| 6,931,397 B1 | 8/2005 | Sundaresan | 707/5 |
| 6,952,730 B1* | 10/2005 | Najork et al. | 709/225 |
| 6,954,776 B1 | 10/2005 | Cruanes et al. | |
| 7,032,168 B1 | 4/2006 | Gerace et al. | |
| 7,114,128 B2 | 9/2006 | Koppolu et al. | |
| 7,139,933 B2 | 11/2006 | Hsu et al. | |
| 7,158,926 B2 | 1/2007 | Kampe | |
| 7,277,929 B2 | 10/2007 | Ohara | |
| 7,337,297 B2* | 2/2008 | Chen et al. | 711/170 |
| 7,340,467 B2 | 3/2008 | Najork | |
| 7,376,724 B2 | 5/2008 | Goyal et al. | |
| 7,439,970 B1* | 10/2008 | Clarke | 345/419 |
| 7,689,574 B2* | 3/2010 | Chen et al. | 707/715 |
| 7,730,070 B2* | 6/2010 | Hoernkvist | 707/741 |
| 7,779,045 B2* | 8/2010 | Mohamed et al. | 707/802 |
| 7,917,494 B2* | 3/2011 | Muller | 707/711 |
| 8,005,869 B2* | 8/2011 | Corl et al. | 707/797 |
| 2002/0004803 A1 | 1/2002 | Serebrennikov | |
| 2002/0091727 A1 | 7/2002 | Kerr et al. | |
| 2002/0133697 A1 | 9/2002 | Royer et al. | 713/150 |
| 2002/0152230 A1* | 10/2002 | Gusler et al. | 707/204 |
| 2003/0033378 A1 | 2/2003 | Needham et al. | |
| 2003/0093412 A1 | 5/2003 | Urkumyan | |
| 2003/0229626 A1* | 12/2003 | Nayak | 707/3 |
| 2004/0044659 A1* | 3/2004 | Judd et al. | 707/3 |
| 2004/0103105 A1* | 5/2004 | Lindblad et al. | 707/100 |
| 2004/0210826 A1* | 10/2004 | Najork | 715/501.1 |
| 2005/0036482 A1 | 2/2005 | Goroshevsky | |
| 2005/0251526 A1* | 11/2005 | Nayak | 707/100 |
| 2005/0256860 A1 | 11/2005 | Eiron et al. | |
| 2006/0010146 A1* | 1/2006 | Nayak | 707/100 |
| 2006/0170948 A1* | 8/2006 | Kobashi | 358/1.13 |
| 2006/0288181 A1* | 12/2006 | Wyles | 711/163 |
| 2007/0124277 A1* | 5/2007 | Chen et al. | 707/2 |
| 2007/0271242 A1* | 11/2007 | Lindblad | 707/3 |
| 2008/0010256 A1* | 1/2008 | Lindblad et al. | 707/3 |
| 2008/0059507 A1 | 3/2008 | Najork | |
| 2008/0098300 A1* | 4/2008 | Corrales et al. | 707/3 |
| 2009/0228528 A1* | 9/2009 | Ercegovac et al. | 707/203 |
| 2010/0031003 A1* | 2/2010 | Chen et al. | 707/7 |
| 2010/0094870 A1* | 4/2010 | Narang et al. | 707/736 |
| 2011/0320692 A1* | 12/2011 | Maeda et al. | 711/103 |

OTHER PUBLICATIONS

Arasu, A. et al., "PageRank Computation and the Structure of the Web: Experiments and Algorithms", *Technical Report, IBM Almaden Research Center*, Nov. 2001, 3 pages.

Bharat, K. et al., "Improved Algorithms for Topic Distillation in a Hyperlinked Environment", 21$^{st}$ *ACM SIGIR Conference on Research and Development in Information Retrieval*, 1998, 5 pages.

Bharat, K. et al., "The Connectivity Server: fast access to linkage information on the Web", *Computer Networks and ISDN Systems*, 1998, 30, 469-477.

Brin, S. et al., "The Anatomy of a large-scale hypertextual Web search engine", *computer Networks and ISDN Systems*, 1998, 30, 107-117.

Chen, Y-Y. et al., "I/O-Efficient Techniques for Computing Pagerank", *CIKM*, 2002, 5 pages.

Cormen, T.H. et al., "Introduction to Algorithms", *MIT Press/ McGraw-Hill*, 1990, 337-344.

Ding, C. et al., "PageRank, HITS and a Unified Framework for Link Analysis", *Lawrence Berkeley National Laboratory*, Nov. 2001, 1-12.

Fielding, R.T., "Maintaining Distributed Hypertext Infostructures: Welcome to MOMspider's Web", *Proceedings of the 1$^{st}$ International Conference on the World Wide Web*, 1994, 11 pages, http://scholar.google.com.

Haveliwala, T. H. et al., "Efficient Computation of PageRank", Oct. 18, 1999, 1-15.

Hoschek, W., "A Database for Dynamic Distributed Content and its Application for Service and Resource Discovery", *Proc. of the Int'l. IEEE Symposium on Parallel and Distributed Computing (ISPDC 2002)*, Iasi, Romania, Jul. 2002, 16 pages.

Hsu, C-L. et al., "A Web Database Application Model for Software Maintenance", http://www.scit.wlv.ac.uk/~f9679743/more-discspace/public_html/journals/database, 1999, 7 pages.

Kappe, F., "A Scalable Architecture for Maintaining Referential Integrity in Distributed Information Systems", ftp://ftp.iicm.edu/pub/papers/p-flood.pdf, 1995, 21 pages.

Kleinberg, J.M. "Authoritative Sources in a Hyperlinked Environment", *Proceedings of the ACM-SIAM Symposium on Discrete Algorithms*, 1998, 1-31.

Lempel, R. et al., "The Stochastic Approach for Link-Structure Analysis (SALSA) and the TKC Effect", *Department of Computer Science, The Technion*, 1-39.

"The PageRank Citation Ranking: Bringing Order to the Web", Jan. 29, 1998, 1-17.

Pitkow, J.E. et al., "Supporting the Web: A Distributed Hyperlink Database System", *Fifth International World Wide Web Conference*, 1996, http://pitkow.com/docs/1996-WWW5-HyperlinkDatabase.pdf, 1-10.

Randall, K.H. et al., "The Link Database: Fast Access to Graphs of the Web", *SRC Research Report*, www.research.compaq.com/SRC, Nov. 16, 2001, 1-16.

Suel, T. et al., "Compressing the Graph Structure of the Web", pp. 1-10.

In the United States Patent and Trademark Office, Non-Final Office Action in re:. U.S. Appl. No. 11/512,887, filed Aug. 29, 2006, dated Feb. 4, 2009, 20 pages.

Heimeriks, G. et al., "Analyzing Hyperlinks Networks: The Meaning of Hyperlink Based Indicators of Knowledge", Cybermetrics, Issue Contents, 2006, 10, 19 pages, http://www.cindoc.csic.es/cybermetrics/articles/v10ilp1.pdf.

Dipl. Ing. Wolfgang Hoschek, "A Unified Peer-to-Peer Database framework for Xqueries over Dynamic Distributed Content and Its Application for Scalable Service Discovery", Mar. 2002, http://www.big.tuwien.ac.at/research/publications/phdtheses/hoschek.pdf, 157 pages.

Palmer, C.R. et al., "ANF: A Fast and Scalable Tool for Data Mining in Massive Graphs", SIGKDD, 2002, 81-90, http://delivery.acm.org.

Weiss, R. et al., "HyPursuit: A Hierarchical Network Search Engine that Exploits Content-Link Hypertext Clustering", Hypertext, 1996, 180-193, http://delivery.acm.org.

United States Patent and Trademark Office, Non-Final Office Action dated Oct. 5, 2005, in U.S. Appl. No. 10/413,645, filed Apr. 15, 2003.

United States Patent and Trademark Office, Final Office Action dated Feb. 2, 2006, in U.S. Appl. No. 10/413,645, filed Apr. 15, 2003.

United States Patent and Trademark Office, Non-Final Office Action dated Aug. 18, 2006, in U.S. Appl. No. 10/413,645, filed Apr. 15, 2003.

United States Patent and Trademark Office, Final Office Action dated Feb. 1, 2007, in U.S. Appl. No. 10/413,645, filed Apr. 15, 2003.

United States Patent and Trademark Office, Notice of Allowance dated Oct. 9, 2007, in U.S. Appl. No. 10/413,645, filed Apr. 15, 2003.

United States Patent and Trademark Office, Notice of Allowance dated Dec. 13, 2007, in U.S. Appl. No. 10/413,645, filed Apr. 15, 2003.

United States Patent and Trademark Office, Final Office Action dated Jul. 16, 2009, in U.S. Appl. No. 11/512,887, filed Aug. 29, 2006.

In the United States Patent and Trademark Office, Non-final Office Action dated Nov. 8, 2011, in U.S. Appl. No. 11/512,887, filed Aug. 29, 2006.

In the United States Patent and Trademark Office, Final Office Action dated Aug. 20, 2010, in U.S. Appl. No. 11/512,887, filed Aug. 29, 2006.

\* cited by examiner

INCREMENTAL UPDATE SCHEME FOR HYPERLINK DATABASE

BACKGROUND

Web search services allow users to submit queries, and in response, they return a set of links to web pages that satisfy the query. Because a query may potentially produce a large number of results, search engines typically display the results in a ranked order. There are many ways to rank-order the links resulting from a query, including content-based ranking, usage-based ranking, and link-based ranking. Content-based ranking techniques determine how relevant the content of a document is to a particular query. Usage-based ranking techniques monitor which result links users actually follow, and boost the rank of these result links for subsequent queries. Link-based ranking techniques examine how many other web pages link to a particular web page, and assign higher ranks to pages with many incoming links. Examples of link-based ranking algorithms include PageRank, HITS, and SALSA.

Link-based ranking algorithms view each page on the web as a node in a graph, and each hyperlink from one page to the other as a directed edge between the two corresponding nodes in the graph. There are two variants of link-based ranking algorithms: query-independent ones (such as PageRank) that assign an importance score (independent of any particular query) to all the web pages in the graph, and query-dependent ones (such as HITS and SALSA) that assign a relevance score with respect to a particular query to each web page returned in the result set of a query. Query-independent scores can be computed prior to the arrival of any query, while query-dependent scores can only be computed once the query has been received.

Users expect to receive answers to a query within a few seconds, and all major search engines strive to provide results in less than one second. Therefore, any query-dependent ranking algorithm desirably has to compute scores for all pages in the result set in under one second, and ideally within less than 100 milliseconds. However, the seek time of modern hard disks is on the order of 10 milliseconds, making them too slow to be used as a medium to store the web graph. In order to meet the time constraints, the web graph (or at least the most frequently used portions of it) has to be stored in memory, such as RAM, as opposed to disk storage.

A graph induced by the web pages stored in the corpus of a major search engine is extremely large. For example, the MSN Search corpus contains 5 billion web pages, which in turn contain on the order of 100 billion hyperlinks; the Google corpus is believed to contain about 20 billion web pages containing on the order of 400 billion hyperlinks. A web graph of this size cannot be stored in the memory of a single machine, even if the most effective compression techniques are applied. Therefore, the graph is distributed ("partitioned") across multiple machines. Distributing the graph is orthogonal to compressing it; in practice, one does both.

U.S. patent application Ser. No. 10/413,645, filed Apr. 15, 2003, entitled "System and method for maintaining a distributed database of hyperlinks", and incorporated herein by reference in its entirety, describes a scheme for distributing a database of hyperlinks across multiple machines, such as database processors. An embodiment is referred to as the Scalable Hyperlink Store, or SHS (used herein to refer to any distributed hyperlink database).

SHS represents a web graph as three databases or "stores": a uniform resource locator (URL) store, a forward link store, and a backward link store. Each store is partitioned across multiple machines; each machine will hold corresponding fractions ("partitions") of each store in main memory to serve queries.

Major search engines crawl the web continuously, causing their view of the web to change over time. These changes are reflected in the search engine's index in a timely fashion. A hyperlink database such as SHS is also timely updated.

Continuous crawling can change the search engine's view of the web graph as new pages are discovered that should be added to the hyperlink database, pages become irretrievable and should be deleted from the hyperlink database, the links in newly discovered pages should be added to the hyperlink database, the links in deleted pages should be deleted from the hyperlink database, and the links contained in changed pages should be updated in the hyperlink database. Currently, it is prohibitively complex and expensive to perform incremental updates on an existing hyperlink database or URL store, for example. Supporting incremental updates in hyperlink databases is challenging and expensive because of, for example, the linear data structures used and the order of the URLs or links.

SUMMARY

A database of hyperlinks, whether stored in a hyperlink store or distributed across multiple machines such as a scalable hyperlink store, may be incrementally updated. This increases the freshness of the data in the database or store. The database or store may store contents of URLs/links in a linear sequence in memory that is compressed. A chain of stores of decreasing vintage is maintained, along with a technique for merging suffixes of the chain in order to bound its length. More particularly, when data is added, instead of modifying an existing data store, a hierarchy of data stores is built. The data stores are merged together, such that a new store is a suffix on an old store. Additions and updates go into new stores, which are relatively small. Lookups consult new stores first. A background thread merges adjacent stores.

For example, a batch of updates is collected and incorporated into a new store (e.g., URL, forward link, backward link), and then the store is sealed. Subsequent updates are added to yet another new store. Because every batch of updates creates a new store, the number of stores would otherwise go towards infinity; however, stores are merged occasionally to prevent the chain of stores from becoming too long. Once the batch of updates has been integrated, the new stores are sealed and are used to answer subsequent queries.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Web pages are identified by uniform resource locators (URLs). A typical URL is of the form http://xyz.com/a/b, where xyz.com (the "host" of the URL) identifies the web server providing this web page, and /a/b (the "path" of the URL) identifies the page itself (relative to web server xyz.com). Major search engines index pages drawn from on the order of 50 million hosts. As used herein, host(u) denotes the host of URL u.

Figure 1:
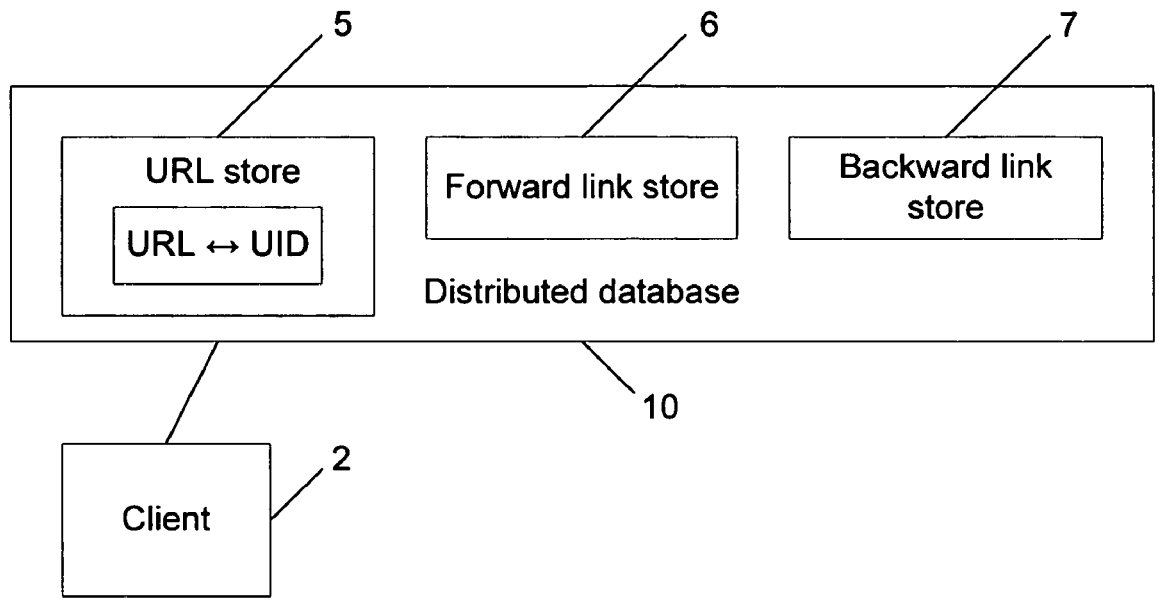
FIG. 1 is a high level block diagram of an example distributed database system.

URLs are on average about 80 characters long. In order to compress the web graph efficiently, a distributed database for maintaining hyperlinks stores hyperlinks not as URLs, but rather as 64-bit integers called unique identifiers (UIDs). FIG. 1 is a high level block diagram of an example distributed database system. There is a one-to-one mapping between URLs and UIDs. This mapping is maintained by a URL store 5 in the distributed database system 10. The URL store 5 provides a method UrlToUid for mapping a URL to its corresponding UID, and a method UidToUrl for mapping a UID back to its corresponding URL.

In addition to the URL store 5, a distributed database system 10 for maintaining hyperlinks maintains a forward link store 6 and a backward link store 7. The forward link store 6 provides a method, GetLinks, which, given a UID (representing a URL), returns a list of the UIDs (representing URLs) that the given UID links to. Similarly, the backward link store 7 provides a method, GetLinks, which, given a UID, returns a list of UIDs that link to the given UID. A client 2 may interact with the servers that are comprised within the database system 10.

Describing the three stores in terms familiar to a mathematician, the URL store contains the node set of the web graph, the forward link store contains the adjacency matrix induced by the edge set, and the backward link store contains the transpose of the adjacency matrix.

Figure 2:
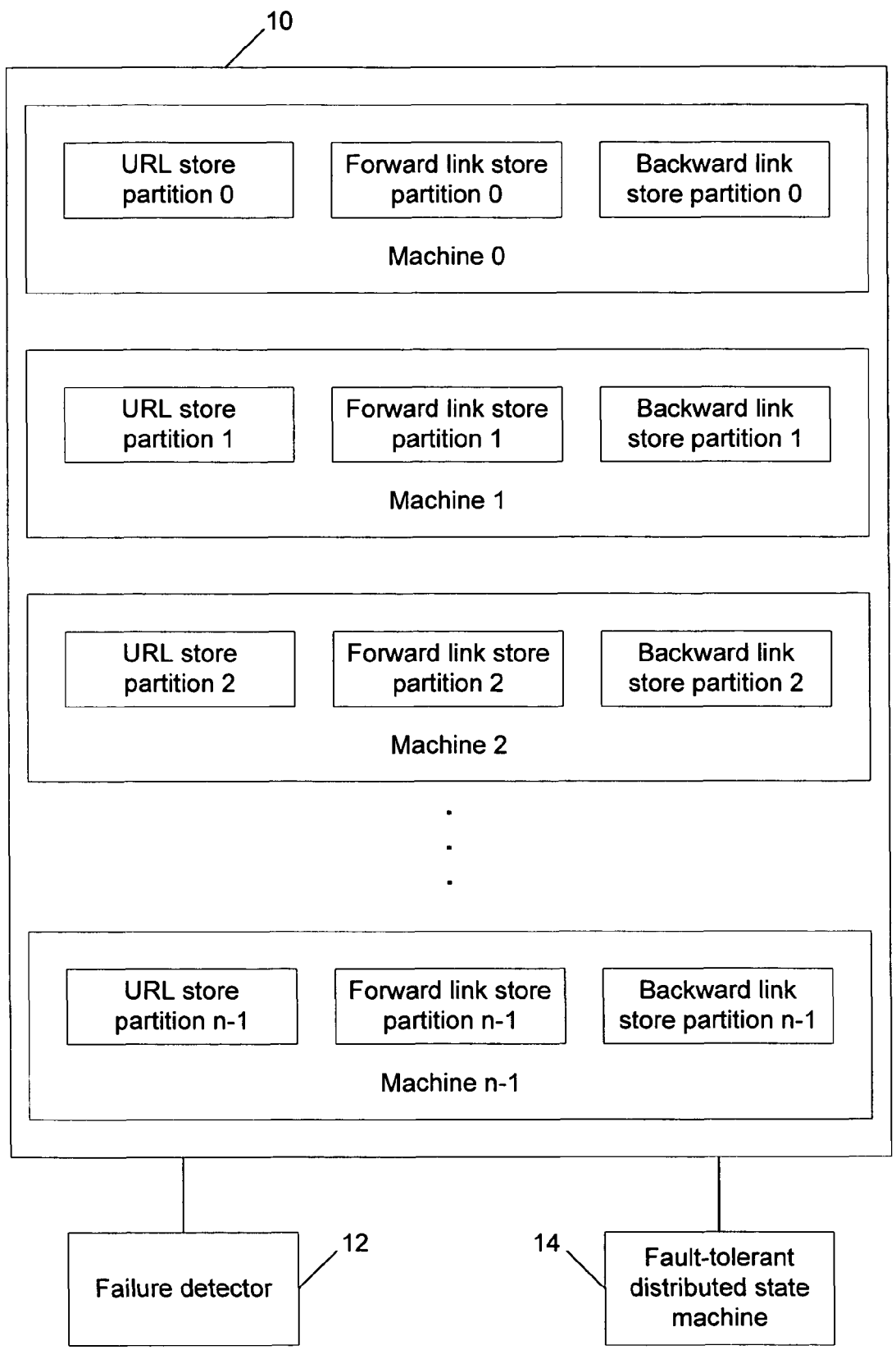
FIG. 2 is a more detailed block diagram of the example system of FIG. 1.

FIG. 2 is a more detailed block diagram of the example system of FIG. 1. A distributed database system 10 running on a cluster of machines, such as servers and/or database processors, for example, connected by a high speed network, is provided, and each of the three stores is partitioned across the machines or servers in the clusters. Assume that the cluster comprises n machines, numbered 0 to n−1. The URL, backward link, and forward link store partitions are numbered accordingly.

The distributed database system uses a hash function $H_1$ mapping host names to the integer range [0 ... n−1] to place URLs into URL store partitions. A URL u is placed in the URL store partition numbered $H_1$(host(u)). So all URLs belonging to a particular host (web server) are placed in the same URL store partition. Furthermore, a simple hash function application may be used to determine which URL store partition contains a particular URL.

Figure 3:
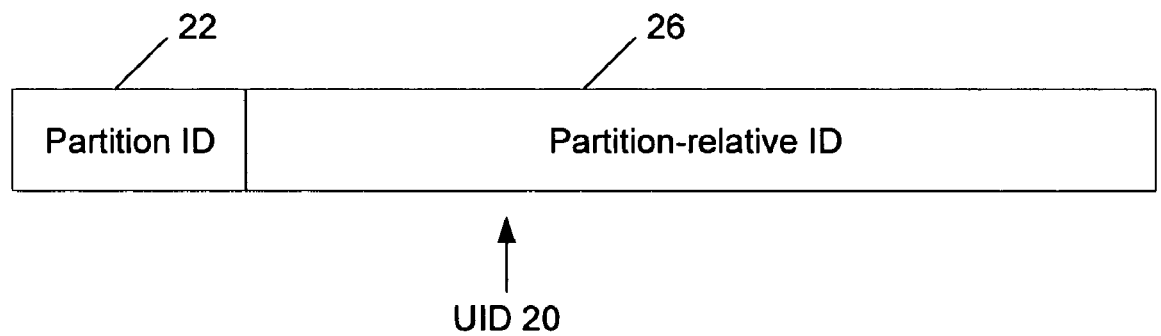
FIG. 3 is a diagram of an example unique identifier (UID) format.

An example UID format is shown in FIG. 3. The most significant few (e.g., 8) bits of a UID 20 encode the identity of the store partition containing the corresponding URL as a partition ID in portion 22. The remaining bits encode a number that is unique relative to that machine as a partition-relative ID in portion 26.

For example, given a URL http://xyz.com/a/b and assuming that $H_1$(xyz.com) is 17, this URL is placed in URL store partition 17 on machine 17 of the cluster of machines, and the highest few bits, corresponding to portion 22 in FIG. 3, of the corresponding UID encode the number 17. So given a UID, it is straightforward to determine the URL store partition that maintains the mapping between this UID and its corresponding URL.

The partition-relative ID is drawn from a densely packed space, by sorting all URLs placed in a given URL store partition in lexicographic order and using their position in that ordering as the partition-relative identifier. So all UIDs referring to web pages on the same host desirably occupy a densely populated numeric interval, with no UID referring to a web page on a different host falling into that interval.

Both the forward link store and the backward link store implement mappings from UIDs to lists of UIDs. The forward link store maps a UID u to the list of UIDs linked to by u, and the backward link store maps a UID u to the list of UIDs linking to u. Both stores are partitioned according to the partition ID of u (that is, the UID that is the argument to the mapping). Given a UID u whose partition ID is x, partition x of the forward link store contains the mapping of u to the pages u links to, and partition x of the backward link store contains the mapping of u to the pages linking to u.

Clients of a distributed database system hash the host component of a URL or extract the partition ID of a UID in order to determine which machine in the cluster to contact, and then send their UrlToUid, UidToUrl, or GetLinks requests to the appropriate machine.

The URL store maintains a bijective mapping between string-typed URLs and integer-typed UIDs. Such a data structure may be realized in several ways, including maintaining a hash table mapping URLs to UIDs, and a second table mapping UIDs back to URLs, and using a data structure that keeps the URL/UID pairs in sorted order, and performing both URL-to-UID and UID-to-URL mappings using this single data structure. Examples of such data structures include binary search trees, B-trees, and sorted lists of URL/UID pairs.

Here, the URL store is desirably maintained as a sorted list of URL/UID pairs because this implementation is space-efficient and efficient memory utilization is desirable.

A current URL store implementation uses slightly less than 15 bytes per URL, and is very space-efficient. It achieves this space-efficiency by using the following techniques. It keeps the URLs in lexicographic sorted order, thereby opting for a search-based as opposed to a hash-based URL lookup scheme. It replaces the prefix of a URL that is common with the prefix of the previous URL by the length of that shared prefix. This technique is beneficial because the URLs are stored in lexicographically sorted order, and therefore tend to have substantial shared prefixes. The store implementation does not store the UID explicitly; instead, UIDs are implied by the position of the URL in the list. This means that the numbering of UIDs reflects the lexicographic ordering of URLS; URLs that belong to the same host will have UIDs that are numerically close. It linearizes the URL list in memory, thereby avoiding any pointer overhead. In addition to the URL store, SHS maintains two other main stores as noted above: a forward link store and a backward link store.

A link store is a mapping from UIDs to lists of UIDs. Any implementation of link stores should provide a time-efficient method for mapping UIDs to lists, and it should represent the mapping in a space-efficient form. Link stores could be realized as hash tables, search trees (e.g. binary search trees or B-trees), or sorted lists. Sorted lists are very space-efficient, and are used herein. Link stores are represented as follows. A link store consists of a sequence of UID-to-UID-list records. The sequence is linearized in memory, i.e., there are no pointers (and thus no space overhead due to pointers). The records may have varying lengths, so it is not straightforward to locate the nth record. The UIDs (the keys of the mapping) are arranged in a numerically sorted order. Because UIDs indicate the position of a URL in the URL store, the set of UIDs forms an uninterrupted interval. Because the UID of each record can be inferred from the position of each record in the link store, the UID can be omitted.

The system maintains an index on the side that records the beginning of every kth record in the link store (k is fixed, typical values range from 10 to 1000). In order to locate a particular UID-to-UID-list record r in the link store, the system consults the index to determine the beginning of the closest record ahead of r in the store, and then sequentially reads through the link store to retrieve r. A UID-list consists of a number indicating the number of elements in the list, followed by the UIDs. Instead of storing absolute UIDs, each UID x is represented by the difference ("gap") between x and its predecessor in the list. As a special case, the first UID x is represented in the list as the difference between x and the (implicit and omitted) UID that is the key of that record. This encoding is known in the art as "gap encoding". Since the UID-list is arranged in sorted order, all but the first gap in the list are positive.

As mentioned above, UIDS reflect the position of URLs in the URL store, which is kept in lexicographic sorted order. Hence, URLs belonging to the same host will have UIDs that are numerically close, which means that the difference between two such UIDs will be small. On average, over 80% of all hyperlinks on a web page point to other web pages on the same host. So, the gap values in UID-lists tend to be numerically small. This property may be exploited by employing variable-length number encoding schemes such as variable-byte-length codes, variable-nybble-length codes, Huffmann codes, or arithmetic codes. The choice of coding scheme reflects a trade-off between space-efficiency and time-efficiency—e.g., arithmetic codes are highly space-efficient, but expensive to decode, while variable-byte-length codes are less space-efficient, but also much faster to decode.

Using variable-nybble-length codes and an index entry for every $32^{nd}$ record, a forward link can be represented using about 2 bytes and a backward link using about 2.75 bytes. In other words, the 8-byte UIDs representing forward and backward links may be compressed by 75% and 66%, respectively.

The corpus of most major search engines changes continuously. For example, MSN Search crawls about 500 million web pages per day and incorporates these updates into the index. Some of these pages will not have been in the index before, while others will have been re-crawled. Because the update frequency of web pages is fairly high, the hyperlinks of a substantial fraction of the re-crawled pages will have changed. It is desirable that a timely view of the web graph is presented. Continuous crawling can change the search engine's view of the web graph as new pages are discovered, as pages should be deleted, as links should be added, etc.

The above described implementation of URL stores and link stores is not well-suited to support update operations. Because the URLs in the URL store are in lexicographic sorted order, any new URLs would have to be inserted into the middle of the store, and because the URLs are linearized in memory, this would require copying substantial amounts of data (e.g., several gigabytes) from one memory location to another. Also, inserting a new URL into the middle of the URL store changes the URL-to-UID mapping—the UID of any URL past the insertion point is implicitly incremented by 1 (since UIDs indicate the position of the corresponding URL in the URL store). So inserting a new URL in the URL store would also require scanning all link stores for any occurrences of UIDs corresponding to URLs beyond the insertion point, and incrementing these UIDs accordingly. Because the link stores are compressed and because incrementing a UID may change the size of the compressed representation, this might furthermore necessitate completely rewriting each link store. In any event, the link store would also have to be rewritten in order to accommodate the new UID-to-UID-list record that goes along with the new URL. Thus, updating the database stores in the manner described above would be prohibitively expensive.

It is desirable to instead incorporate the updates into new stores, and to subsequently use both new and old stores to answer queries to the SHS system. It is not desirable to maintain just a single new URL, forward link, and backward link store. If this strategy were pursued, each new store would eventually grow to be comparable in size to the old store, meaning that updates to the new store would be as expensive as updates to the old store. Instead, a batch of updates is collected, and then incorporated into a new store (e.g., URL, forward link, backward link). The store is then sealed. Subsequent updates are added to yet another new store. The MSN Search crawler bundles up crawled pages in files, each typically containing 65536 ($2^{16}$) pages, giving an appropriately-sized batch of updates. Given that the MSN Search crawler produces one of these files approximately every 15 seconds, it would also be acceptable to use a larger number of such files to perform slightly less frequent updates to SHS.

It is noted that using the technique described above, every batch of updates creates a new store, so in the fullness of time the number of stores would go towards infinity. This is unacceptable because some types of queries require consulting all existing stores. Stores may be occasionally merged (e.g., every 15 seconds) to prevent the chain of stores from becoming too long. The time required to merge a set of stores is proportional to the size of the stores (the stores contain data in sorted order, so merging stores involves a single linear pass through the stores to be merged, producing a merged store). Thus, merging a set of small stores takes less time than merging large stores (e.g., a large store may be about 100 times a large as a small store). Newer stores are typically small since they include the set of updates delivered by the web crawler in the last few minutes or hours, which are dwarfed by the full corpus. Therefore, it is desirable to maintain a chain of stores of various sizes, and to merge the smaller and newer stores more often than the larger and older ones. A technique is provided that maintains a chain of stores such that the chain is of a logarithmically bounded length relative to the aggregate size of the stores, and the size of the stores is monotonically non-increasing along the chain.

It is desirably determined how many stores there should be, what their size ratio should be, and which stores should be merged when. There are many possible techniques for doing this and examples are described herein, along with a generalized case together with an analysis of the average merge cost and the average chain length.

Figure 4:
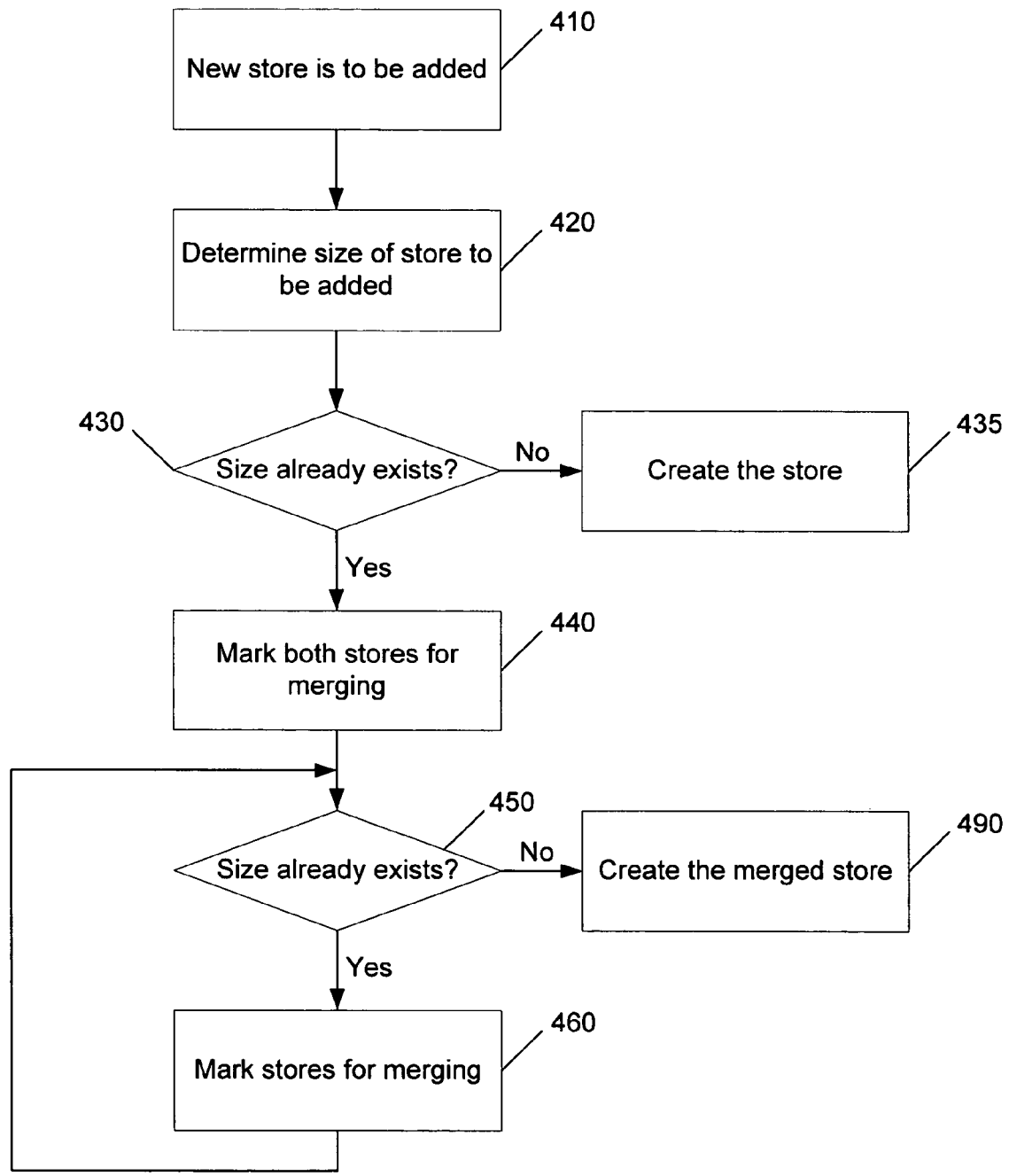
FIG. 4 is a flow diagram of an example merge method.

FIG. 4 is a flow diagram of an example merge method. In this example, a new store is to be added at step 410, and its size is determined at step 420. At step 430, it is determined if this size store already exists. If not, the store is created at step 435. If so, the two stores are marked for merging into a new merged store at step 440. The size of the new merged store is then checked to determine if that size already exists at step 450. If not, the new merged store is created at step 490. Otherwise, the existing store of the new size is marked for merging at step 460. Steps 450 and 460 repeat until it would produce a store having a size that does not already exist. At this point, all the marked stores are merged into a new store at step 490.

Figure 5:
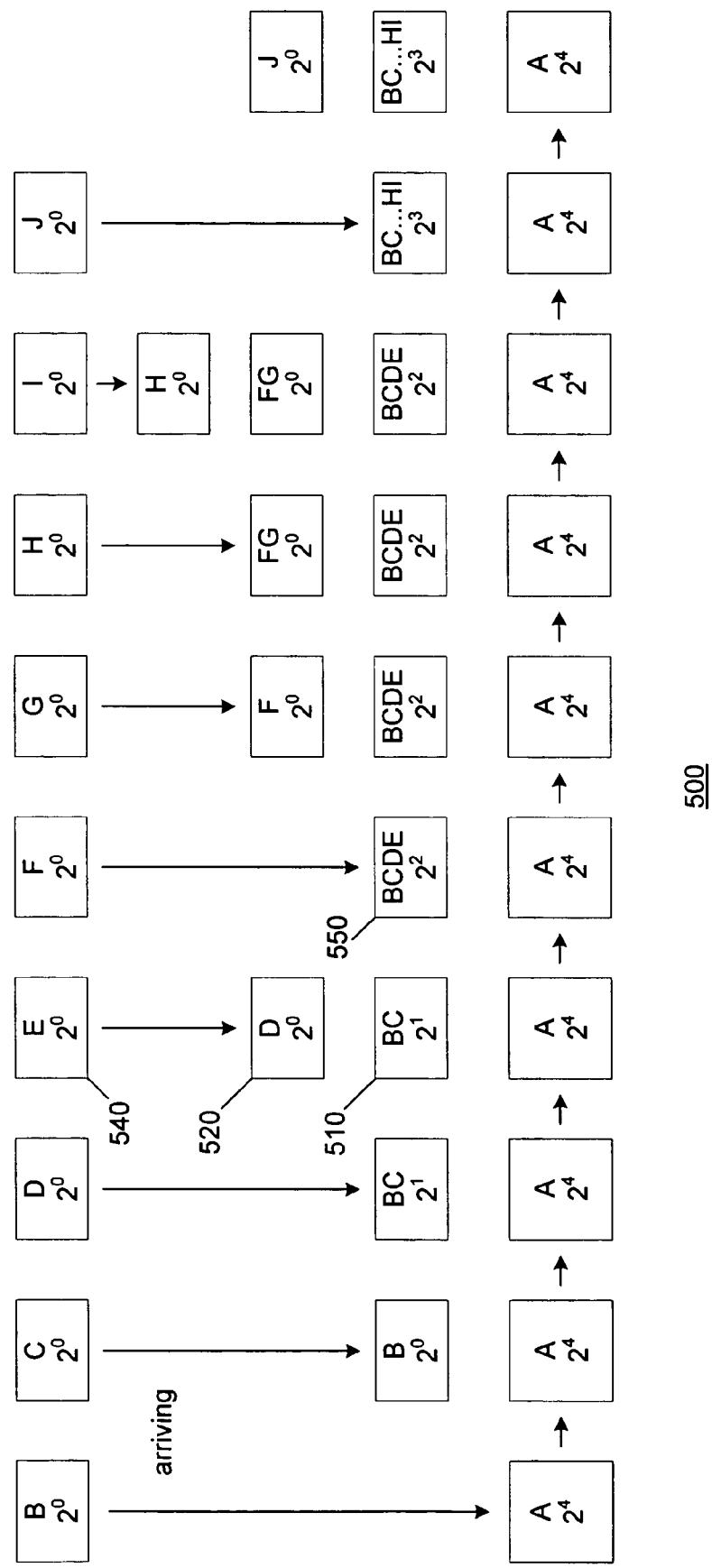
FIG. 5 is a diagram useful for explaining an example technique.

Consider FIG. 5, which shows how new stores B, C, D, E, F, G, H, I, and J may be added to a chain consisting initially of a single large store A to form a hierarchy of stores 500. The new stores have size 1 (or $2^0$), meaning they hold one batch worth of updates, which could translate to tens of thousands or a few million new web pages and hyperlinks; the old store A has size 16 (or $2^4$), meaning it holds data equivalent to 16 batches of updates.

For example, whenever adding a new store would cause there to be two stores of size 1 ($2^0$) (e.g., stores D 520 and E 540), the two stores are marked for merging. The merge would produce a store of size 2 ($2^1$). If there already is a store of size 2 (e.g., store BC 510), that store is marked for merging as well, which would produce a store of size 4 ($2^2$) (e.g., store BCDE 550). This marking process is repeated until it would produce a store of size $2^k$ and there is not already a store of that size. At this point, all the marked stores are merged into a new store.

A chain of stores may be viewed as a binary number. In the example of FIG. 5, the initial left-most chain of stores (consisting of a single store A of size $2^4$) would correspond to the number 10000, and the final right-most chain of stores (consisting of stores A, BCDEFGHI, and J with sizes $2^4$, $2^3$, and $2^0$, respectively) would represent the number 110001. Adding a new store to a store chain corresponds to adding 1 to the binary number describing the chain.

Figure 6:
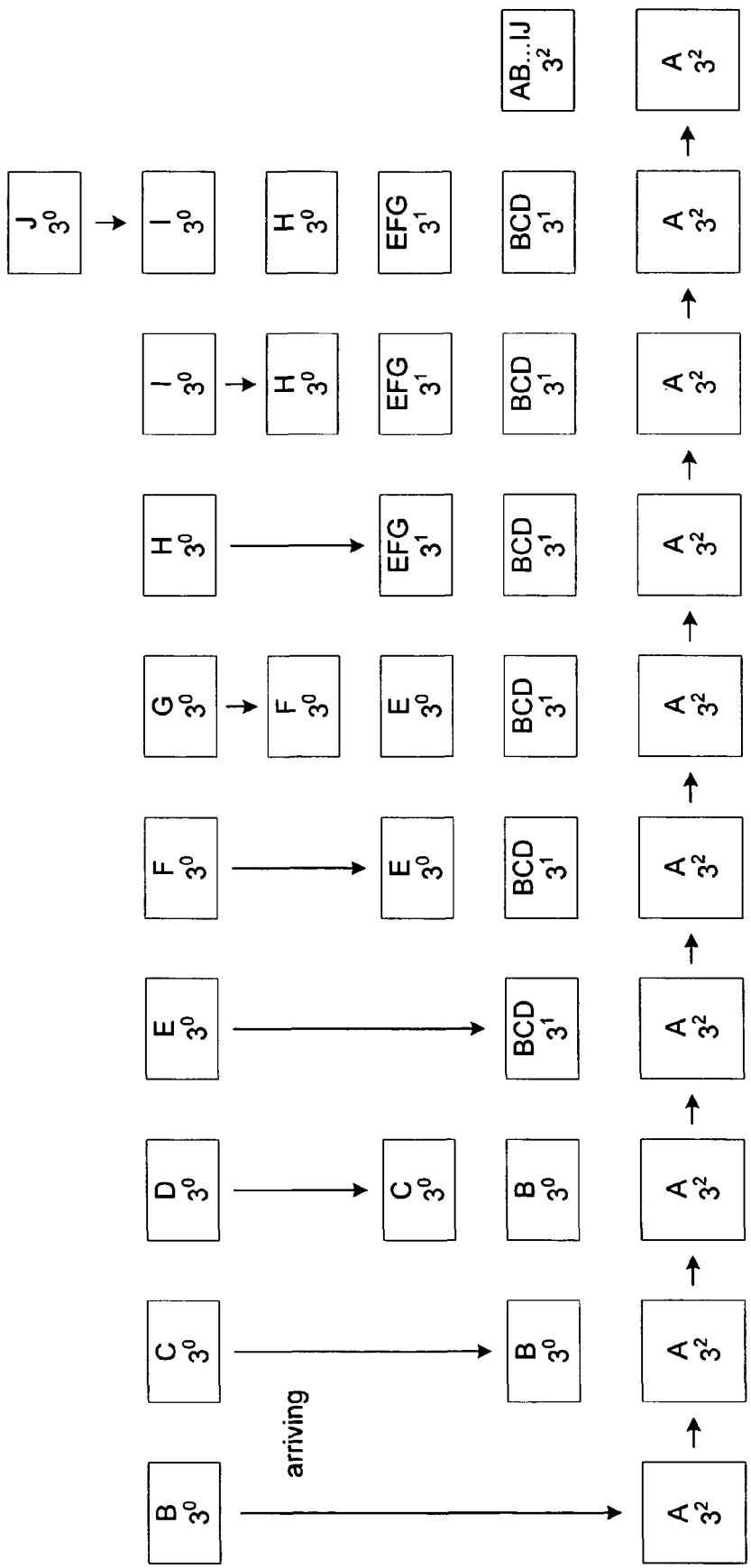
FIG. 6 is a diagram useful for explaining another example technique

This technique may be generalized to stores whose sizes are powers of an arbitrary integer b. For example, FIG. 6 shows a chain consisting initially of a single store A of size $3^2$, and a sequence of additions to the chain and resulting merges. In this example, whenever adding a new store would cause there to be 3 stores of size 1 ($3^0$), the 3 stores are marked for merging. The merge would produce a store of size 3 ($3^1$). If there already are two (or 3-1) stores of size 3, these stores are marked for merging as well, which would produce a store of size 9 ($3^2$). This marking process is repeated until it would produce a store of size $3^k$ and there are not already two stores of that size. At this point, all the marked stores are merged into a new store.

As in the previous example, one can view these store chains as a number, but now the base of the number system is 3. The initial left-most chain of stores (consisting of a single store A of size $3^2$) would correspond to the number 100, the next eight configurations the numbers 101, 102, 110, 111, 112, 120, 121, and 122, and the final right-most chain of stores (consisting of stores A and BCDEFGHIJ, both of size $3^2$) would represent the number 200. Adding a new store to a store chain corresponds to adding 1 to the ternary number describing the chain.

Figure 7:
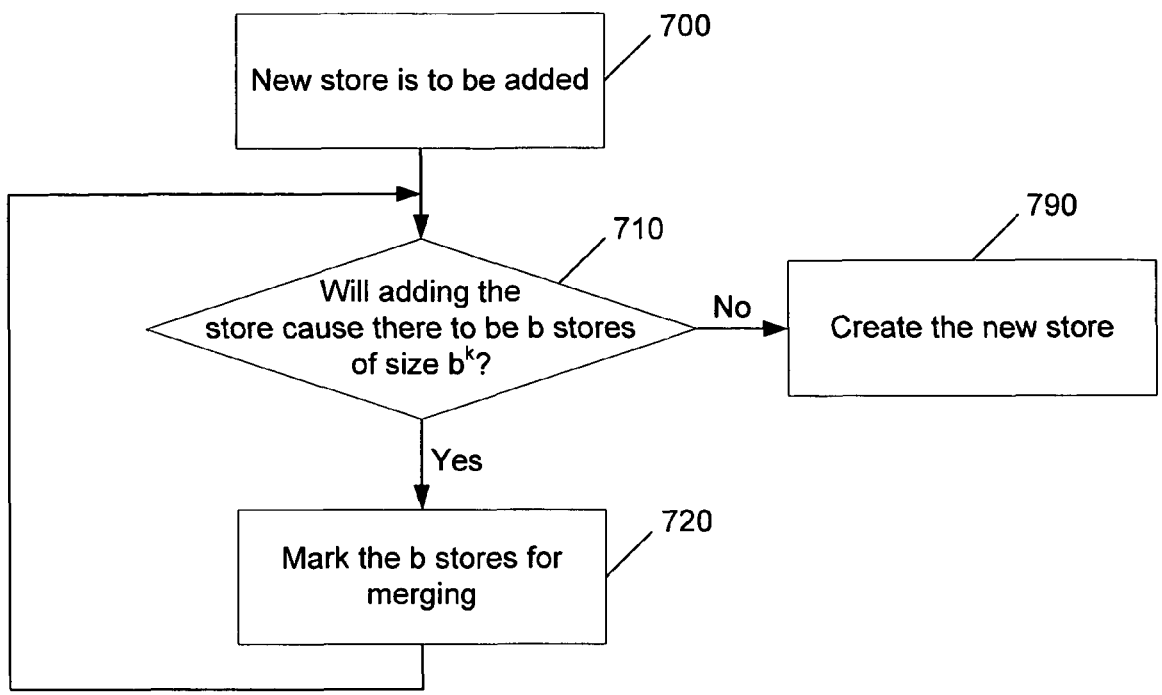
FIG. 7 is a flow diagram of another example merge method.

In general, if it is determined that the size of each store in a chain should be a power of b, an example method for adding stores to a chain is as follows, described with respect to FIG. 7. A new store is desired to be added at step 700. Whenever adding a new store would cause there to be b stores of size $b^0$, as determined at step 710, the b stores are marked for merging at step 720. The marking process is repeated until it would produce a store of size $b^k$ and there are not already b−1 stores of that size. At this point, the marked stores are merged into a new store at step 790. One can view such a configuration as a number written in base b. Adding a new store to a store chain corresponds to adding 1 to the base-b number describing the chain.

Averaging over all possible store chains whose combined size is at most n and where the size of each individual store is a power of b, the average chain length is:

$$O\left(\left(\frac{b-1}{2}\right)(\log_b n - 1)\right)$$

And the average merge cost (where merging a set of stores of combined size x has cost x) is:

$$O\left(\frac{1}{b} + \frac{b-1}{b}\log_b n\right)$$

Choosing a value for b represents a tradeoff: the smaller b, the higher the average merge cost, but the lower the average store chain length. From the description above, it is shown that minimizing the merge cost is desirable; minimizing the store chain length is also desirable, since some types of queries may have to consult every store in the chain. So the concrete choice of b is dependent on the expected update and query rates.

It is now described how the different kinds of updates are incorporated into new stores. As explained above, each URL store defines a numeric UID space. The UID spaces of the different URL stores in a chain are non-overlapping. This can be achieved by using some bits of the UID to encode an URL store identifier, or for a non-distributed setting where URL stores are not partitioned across multiple machines, by starting the UID space of a new store past the largest UID of the newest store that is of older vintage. For a distributed setting with partitioned stores, the UID spaces of the different URL stores in a chain may be made non-overlapping by starting the partition-relative ID space of a new URL store partition past the largest partition-relative ID of the newest URL store partition on that machine.

Figure 8:
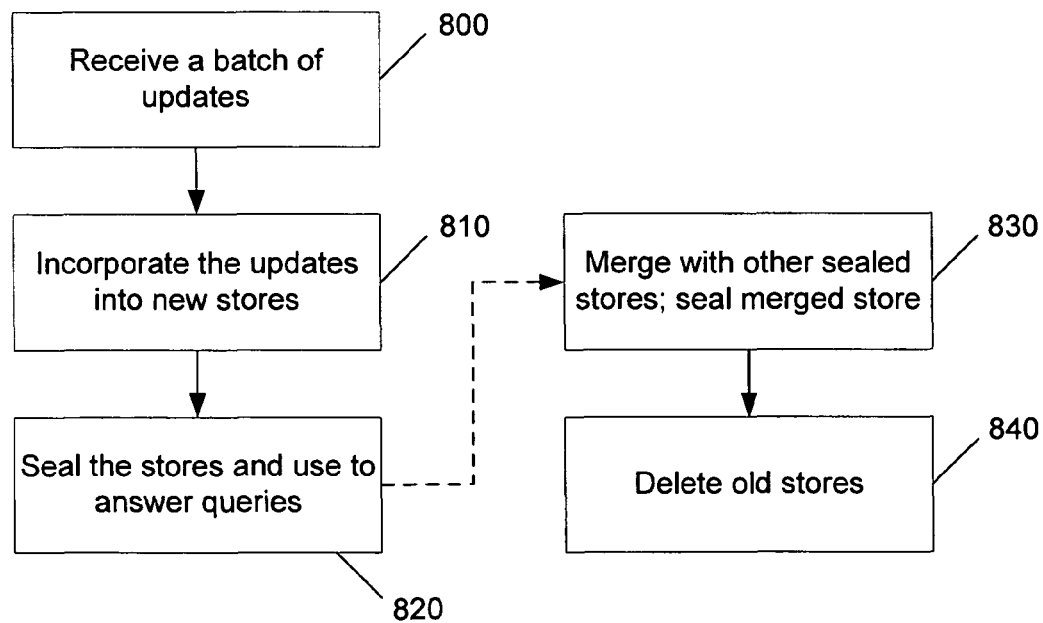
FIG. 8 is a flow diagram of an example update method.

FIG. 8 is a flow diagram of an example update method. A batch of updates is received at step 800, and incorporated into a new store at step 810. In an SHS example, each batch of updates is desirably incorporated into a new URL store, forward link store, and backward link store. Once the batch has been integrated, the new stores are sealed at step 820 and may be used to answer subsequent queries. Sealed stores are desirably never mutated, but they may eventually be merged with other sealed stores at step 830 (resulting in a new merged store that may be sealed), and subsequently deleted at step 840. The term new store refers to a store under construction that receives the data contained in the current batch of updates.

There are two kinds of updates that can go into a new URL store: new URLs may be added, and old URLs may be deleted because the web page they refer to has disappeared (e.g., deleted by the content provider). Adding a new URL is straightforward: the URL is added to the new URL store. Deleting a URL is more complicated: by definition, the URL is part of an existing older URL store, and it is desirable that existing stores are not modified (other than completely deleting them once they have been merged into another store). So it is desirable to keep track of the fact that the URL should eventually be deleted, once the existing old URL store is merged with all URL stores of more recent vintage. A technique to do so is to append a special character (e.g., a carriage return) that cannot appear in any legal URL to the end of the URL that is to be deleted, and adding the resulting string into the URL store. Appending the special character to the end means that the lexicographic ordering of the URLs is not perturbed, the system can locate the deleted URL in the URL store using the techniques described herein, and can determine that the URL is deleted. Eventually, the deleted URL will be merged into the same store as the undeleted URL, at which point both entries can be discarded.

An update to the forward link store consists of a UID u (identifying a web page that may be newly discovered or may have been previously known) together with a list of UIDs $u_1, \ldots, u_k$ identifying the hyperlinks contained in that page. Because u may refer to a URL in any URL store (the new store or any of the older stores), and because references to URLs in old stores will be sparse, it becomes desirable to store u explicitly (whereas in the absence of updates, where there is a single URL store, the link database contains an uninterrupted list to UID lists sorted by u, and u can therefore be omitted).

If an existing page was deleted (e.g., it has a "deleted URL" record in the new URL store), this may be represented in the forward link store by associating its existing UID u, associated with a URL in an older URL store, with an empty list of link UIDs. This association can eventually be deleted, once the older URL store is merged with all URL stores of more recent vintage, causing the URL to be deleted and u to become invalid.

Regarding updates to the backward link store, the backward link store captures the transposed adjacency matrix of the web graph, i.e., it allows to "follow hyperlinks backwards" and determining for a page u which other pages link to u. However, web crawlers deliver pages that contain forward links. Adding a crawled or re-crawled web page to the database system introduces or affects a single record in the forward link stores, but it affects many records in the backward link stores. A page crawled for the first time and containing m links will affect m records in the backward link stores. A page that is re-crawled and that contains m links that were not present in the previous version of the page, while n links that were previously present have now disappeared, will affect m+n records in the backward link store.

Given a crawled page p with associated UID u, one way to implement this would be to retrieve all the affected records from older backward stores, add u to each record (or remove u from the record if p no longer links to the page associated with the record), and add the modified records to the new backward link store. This scheme is inefficient, given that some pages are linked to by millions of other pages. A page containing a new link to such a popular page would require the very large record of that popular page to be added to the new store. Also, extremely popular pages are much more likely to experience change in their set of linkers than less popular pages. Therefore, a more desirable example technique is to not add the entirety of every affected record to the new backward link store, but rather just the difference from recent versions, i.e., added and deleted backward links.

Given a crawled page p, its UID u, and the UIDs $u_1, \ldots, u_k$ of the hyperlinks contained in p, it is determined if u is associated with the new URL store (e.g., in a non-distributed setting, if u's numeric value falls into the interval associated with the new store, meaning that p was crawled for the first time). If this is the case, k new records are added to the backward link store, each record mapping $u_i$ (for $1 \leq i \leq k$) to the UID list containing just u. Otherwise, the old forward link set U of u is retrieved from the older forward link stores (by calling GetLinks, for example), and it is determined how the set $\{u_1, \ldots, u_k\}$ differs from U. Specifically, the set of additions $A = \{u_1, \ldots, u_k\} \setminus U$ to the old link set is determined, along with the set of deletions $D = U \setminus \{u_1, \ldots, u_k\}$. For each $v \in A$, a record is added to the backward link store, the record mapping v to the UID list containing just u. For each $v \in D$, the same is performed, except the link may be marked as having been deleted by setting a designated "deleted-link" bit in u.

It is now described how example query methods may be performed. An example UrlToUid method, given a URL u, will desirably consult the stores in the URL store chain, starting at the most recent store. The store is checked to determine whether it contains u, using the method described above, for example. If u is found, the associated UID (that is, u's position in this store plus the first UID associated with this store) is returned. However, if u followed by the special character indicating URL deletion is found in the store, a special "URL not found" value is returned or an exception is raised, for example. Conversely, if u is not found, the search progresses to the next-older store in the URL store chain. If u is not found in any store along the chain, a special "URL not found" value is returned or an exception is raised, for example.

An example UidToUrl method, given a UID u, will desirably determine which URL store in the chain of stores contains the URL associated with u, by checking which of the numeric UID intervals associated with each store contains u. Then it will map u to its associated URL and return the result.

An example GetLinks method for forward links, given a UID u, will desirably consult the stores in the forward link store chain, starting at the most recent store. The store is checked to determine whether it contains a record with key u. If it does, the UID list portion of that record is returned. Otherwise, the search progresses to the next-older store in the forward link store chain. u will be found in some store along the chain, provided that it is a valid UID.

An example GetLinks method for backward links, given a UID u, desirably searches the backward link store chain starting at the store of u's vintage, that is, the backward link store of the same vintage as the URL store whose numeric UID interval contains u. A record with key u will be found in that store. The UID list associated with that record forms a preliminary result set S. Next, GetLinks searches the next-newer backward store along the chain. If that store contains a record with key u, the elements $u_1, \ldots, u_k$ in the UID list of that record are extracted. For each $u_i$, if the "deleted-link" bit is set, $u_i$ is removed from S, otherwise it is added to S. GetLinks continues to search the chain of stores until it has processed the most recent backward link store, and returns S.

Figure 9:
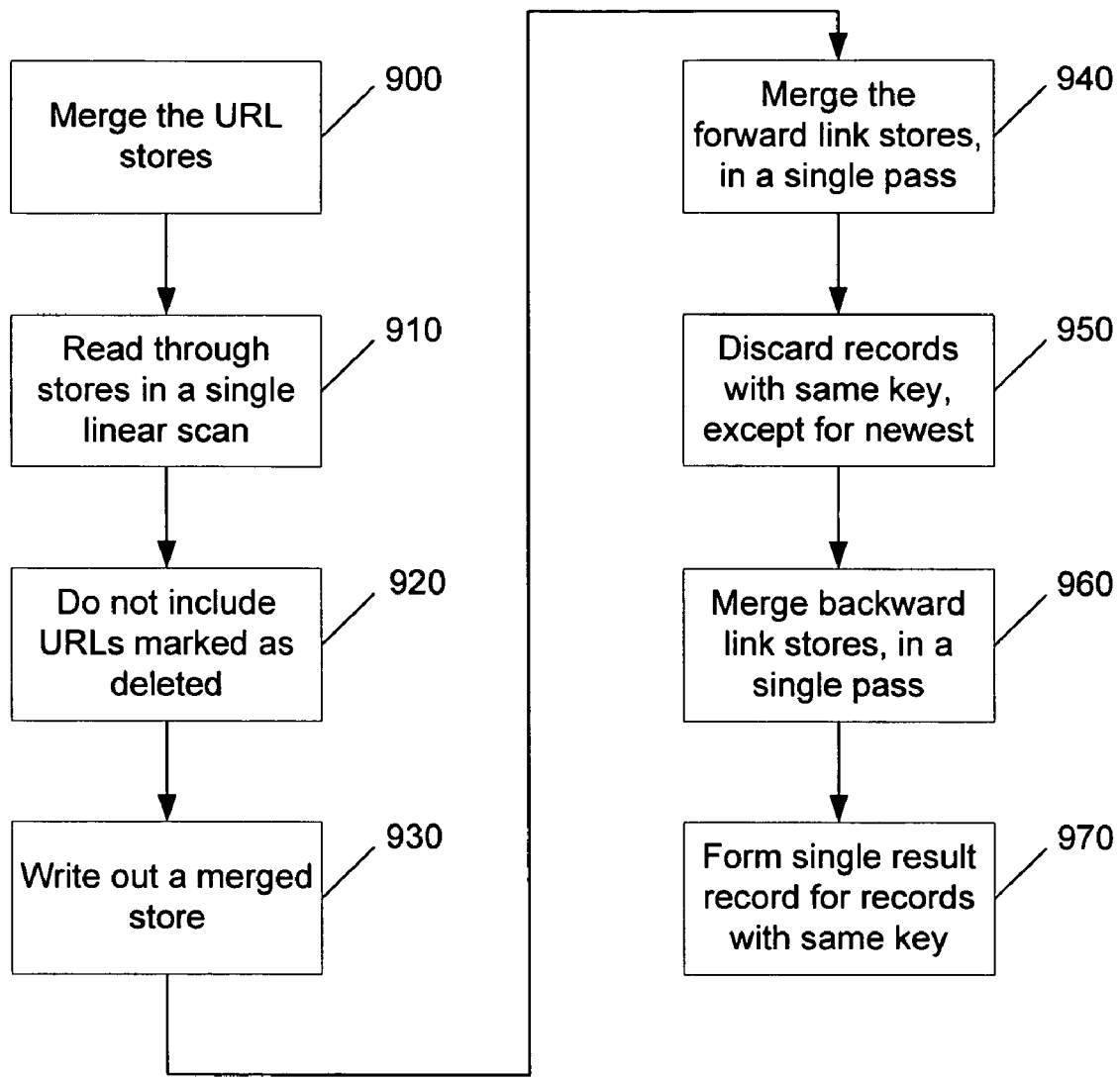
FIG. 9 is a flow diagram of another example merge method.

An example merge operation is described with respect to FIG. 9. The URL stores are merged (step 900), then the forward link stores (step 940), and then the backward link stores (step 960). Merging the URL stores is fairly straightforward. The URLs in each store are already in lexicographically sorted order, so the stores can be merged by reading through all stores in a single linear scan at step 910, and writing out a merged store in the process, at step 930. If a deleted URL (marked by an appended special character, for example) and its non-deleted counterpart are encountered, the deleted URL and its non-deleted counterpart are dropped, i.e., not included into the merged URL store, at step 920. As the merge progresses, one UID translation table per input URL store is being built up in memory. Each table is an array of UIDs, the length of the array being the number of URLs in the corresponding URL store. When a URL is copied from an input store to the merged store, the corresponding slot in the corresponding UID translation table is set to contain the URL's position in the merged store (that is, the URL's future UID). If a URL is not included in the merged store (because it is a deleted URL or its non-deleted counterpart), the corresponding slot in the UID translation table is set to a special value indicating that the URL has been deleted.

Next, the forward link stores are merged. Because the keys of the records in each forward link store are arranged in sorted order, the stores can be merged in a single pass, at step 940. If there are multiple records with the same key, the record drawn from the newest store is copied to the merged store, and all other records with the same key are discarded, at step 950. The UIDs in all records that are being copied to the merged store may be rewritten as follows: If the UID belongs to one of the UID stores that were merged in the previous steps, it is used to reference a slot in the UID translation table associated with that store, and the value in that slot replaces the old UID in the record (if the value is the special "deleted UID" value, the UID is removed from the record). Otherwise (if the UID is of older vintage), the UID remains unchanged.

The backward link stores are then merged. Since the keys of the records in each backward link store are arranged in sorted order, the stores can be merged in a single pass, at step 960. If there are multiple records with the same key, the UID lists in all the records are merged to form a single result record, at step 970. Any UID that has its "deleted-link" bit set cancels out one UID that differs only in the "deleted-link" bit, such UID pairs are not included in the merged UID list. However, any UID that has its "deleted-link" bit set and that does not have a counterpart differing only in the "deleted-link" bit is included in the merged UID list. The UIDs in all records that are being copied to the merged store may be rewritten using the same method as described above, for example.

Merging a number of URL stores causes the UID space to change (hence the need for UID translation tables when merging the corresponding link stores). This poses a problem to clients, which might translate URLs to UIDs using the old (pre-merge) store and then use these UIDs to look up links in the new (post-merge) stores. In order to overcome this problem, client applications desirably use transactional semantics of some kind. Example embodiments include "transaction fails if merge intervenes" and "old stores are deallocated once last transaction has finished".

"Transaction fails if merge intervenes": here, the database service provides a method GetEpoch( ) which returns an epoch identifier (e.g., a 64-bit integer). Clients can obtain the current epoch by calling this method. Whenever a number of stores have been merged and the old pre-merge stores are unloaded from memory and discarded, the epoch identifier is changed (e.g., the 64-bit integer is incremented). Other methods provided by the service (e.g., UrlToUid, UidToUrl, GetLinks etc.) take the epoch identifier as an argument. When a client calls one of these methods and provides an outdated epoch identifier, the service reports back to the client that the epoch has changed (this could be done by the method throwing an exception, for example).

In this example, clients start a transaction by obtaining an epoch identifier, and then use the epoch identifier throughout the transaction. If any of the services called during the transaction fails, the client restarts the transaction from the beginning.

"Old stores are deallocated once last transaction has finished": here, the database service provides two methods: BeginTransaction( ), which returns a transaction identifier (e.g., a 64-bit integer), and EndTransaction(t), which takes a transaction identifier t as an argument. Other methods provided by the service (e.g., UrlToUid, UidToUrl, GetLinks etc.) take the transaction identifier as an argument.

In this example, clients start a transaction by obtaining a transaction identifier, using the transaction identifier throughout the transaction, and calling EndTransaction once the transaction is complete. The service (e.g., the collection of servers) desirably maintains a list of unfinished transactions. When a number of stores have been merged, the old pre-merge stores are desirably not immediately unloaded and discarded. Rather, the service continues to service all requests with transaction identifiers that were given out before the merger was completed. BeginTransaction requests that arrive after the merger was completed are temporarily suspended. Once the last unfinished transaction has been completed (e.g., the client has called the EndTransaction method), the old stores are discarded, the new stores are loaded, and the suspended BeginTransaction requests are serviced, for example.

Although examples described herein may use a distributed database, any hyperlink database may be used, distributed or not.

Exemplary Computing Arrangement

Figure 10:
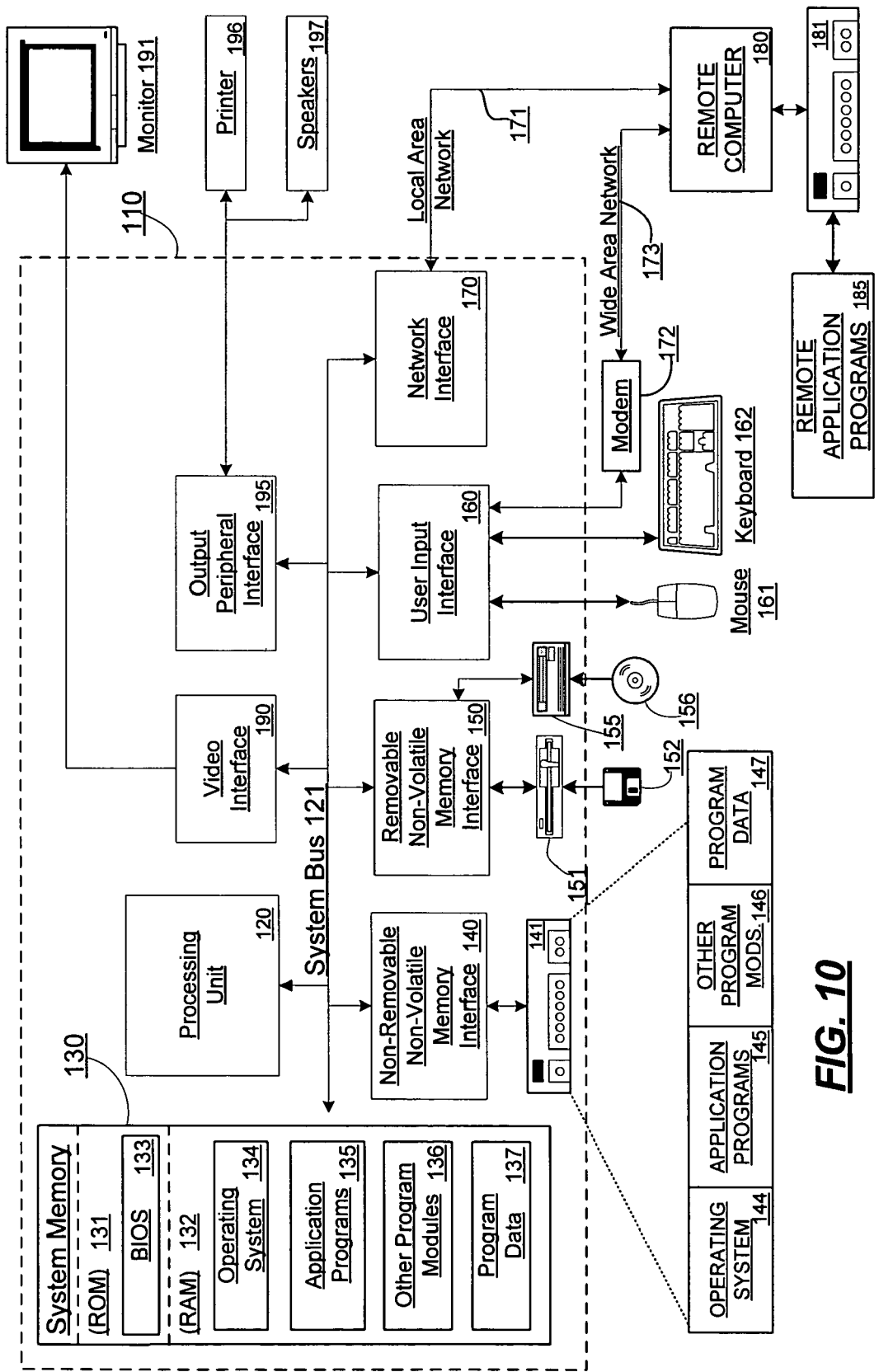
FIG. 10 is a block diagram of an example computing environment in which example embodiments and aspects may be implemented.

FIG. 10 shows an exemplary computing environment in which example embodiments and aspects may be implemented. The computing system environment 100 is only one example of a suitable computing environment and is not intended to suggest any limitation as to the scope of use or functionality. Neither should the computing environment 100 be interpreted as having any dependency or requirement relating to any one or combination of components illustrated in the exemplary operating environment 100.

Numerous other general purpose or special purpose computing system environments or configurations may be used. Examples of well known computing systems, environments, and/or configurations that may be suitable for use include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 10, an exemplary system includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 10 illustrates operating system 134, application programs 135, other program modules 136, and program data 137.

The computer 110 may also include other removable/non-removable, volatile/nonvolatile computer storage media. By way of example only, FIG. 10 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 10, provide storage of computer readable instructions, data structures, program modules and other data for the computer 110. In FIG. 10, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 10. The logical connections depicted in FIG. 10 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 10 illustrates remote application programs 185 as residing on memory device 181. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method comprising:
   receiving an update to a database of hyperlinks comprising a first data store;
   determining if a size of the update is equivalent to a size of the first data store;
   when the size of the update is not equivalent to the size of the at least one first data store, then storing the update in a new data store; and, if not, when the size of the update is equivalent to the size of the first data store, marking the update and the first data store for merging into a new merged data store, wherein storing the update in the new merged data store creates a hierarchy of data stores in the database comprising the new merged data store and the first data store; and when the at least one first data store has been marked for merging and a determined size of the new merged data store is equivalent to a size of at least one other data store, marking the at least one other data store for merging with the new merged data store.

2. The method of claim 1, further comprising creating a merged data store comprising the new data store and the first data store pursuant to a condition.

3. The method of claim 1, further comprising sealing the new data store.

4. The method of claim 3, further comprising receiving a second update after the new data store has been sealed, and storing the second update in a second new data store.

5. The method of claim 2, further comprising sealing the merged data store.

6. The method of claim 2, further comprising deleting the new data store and the first data store after creating the merged data store.

7. The method of claim 2, wherein the condition is based on the size of the new data store.

8. The method of claim 1, wherein the new data store comprises a new uniform resource locator (URL) store, a new forward link store, and a new backward link store.

9. A processor comprising memory having executable instructions stored thereon, the instructions when executed by the processor perform operations comprising:

receiving an update to a database of hyperlinks comprising a first data store;

determining if a size of the update is equivalent to a size of the first data store;

when the size of the update is not equivalent to the size of the first data store, storing the update in a new data store;

when the size of the update is equivalent to the size of the first data store, marking the update and the first data store for merging into a new merged data store, wherein storing the update in the new merged data store creates a hierarchy of data stores in the database comprising the new merged data store and the first data store; and when the first data store has been marked for merging and the size of the new merged data store is equivalent to a size of at least one other data store, marking the at least one other data store for merging with the new merged data store.

10. The processor of claim 9, the operations further comprising creating a merged data store comprising the new data store and the first data store pursuant to a condition.

11. The processor of claim 9, the operations further comprising sealing the new data store.

12. The processor of claim 11, the operations further comprising receiving a second update after the new data store has been sealed, and storing the second update in a second new data store.

13. The processor of claim 9, wherein the new data store comprises a new uniform resource locator (URL) URL store, a new forward link store, and a new backward link store.

14. The processor of claim 10, wherein the condition is based on the size of the new data store.

15. A computer-readable storage medium, that is not a signal per se, the computer-readable medium having stored thereon executable instructions that when executed by a processor perform operations comprising:

receiving an update to a database of hyperlinks comprising a first data store;

determining if a size of the update is equivalent to a size of the first data store;

when the size of the update is not equivalent to the size of the first data store, storing the update in a new data store;

when the size of the update is equivalent to the size of the first data store, marking the update and the first data store for merging into a new merged data store, wherein storing the update in the new merged data store creates a hierarchy of data stores in the database comprising the new merged data store and the first data store; and when the first data store has been marked for merging and the size of the new merged data store is equivalent to a size of at least one other data store, marking the at least one other data store for merging with the new merged data store.

16. The computer-readable storage medium of claim 15, the operations further comprising creating a merged data store comprising the new data store and the first data store pursuant to a condition.

17. The computer-readable storage medium of claim 15, the operations further comprising sealing the new data store.

18. The computer-readable storage medium of claim 17, the operations further comprising receiving a second update after the new data store has been sealed, and storing the second update in a second new data store.

* * * * *